United States Patent [19]

Fiquet et al.

[11] Patent Number: 6,023,006
[45] Date of Patent: Feb. 8, 2000

[54] METHOD OF MANUFACTURING COMPOUNDS OF THE MONAZITE TYPE, DOPED OR NOT DOPED WITH ACTINIDES AND APPLICATION TO THE PACKAGING OF RADIOACTIVE WASTE HIGH IN ACTINIDES AND IN LANTHANIDES

[75] Inventors: Olivier Fiquet, Venelles; Yves Croixmarie, Aix en Provence, both of France

[73] Assignee: Commissariat A L'Energie Atomique, Paris, France

[21] Appl. No.: 09/068,559

[22] PCT Filed: Nov. 19, 1996

[86] PCT No.: PCT/FR96/01829

§ 371 Date: May 20, 1998

§ 102(e) Date: May 20, 1998

[87] PCT Pub. No.: WO97/19034

PCT Pub. Date: May 29, 1997

[30] Foreign Application Priority Data

Nov. 20, 1995 [FR] France .................................. 95 13725

[51] Int. Cl.⁷ ................................ G21F 9/00; C01B 25/12
[52] U.S. Cl. ................................ 588/2; 588/14; 588/15; 588/16; 423/304; 423/325
[58] Field of Search ................................ 588/2, 14, 15, 588/16; 423/304, 325; 976/DIG. 375

[56] References Cited

U.S. PATENT DOCUMENTS

| 4,314,909 | 2/1982 | Beall et al. ............................. 252/629 |
| 4,383,855 | 5/1983 | Aaron et al. ............................. 419/19 |
| 4,488,990 | 12/1984 | Yannopoulos . |
| 5,632,874 | 5/1997 | Christiansen ............................. 204/419 |
| 5,771,472 | 6/1998 | Carpena et al. ............................. 588/2 |

FOREIGN PATENT DOCUMENTS 0 594 485   4/1994   European Pat. Off. .

WO 94 0515   3/1994   WIPO .

OTHER PUBLICATIONS

D.D. Davis et al; "Crystal Chemistry and Phase Relations in the Synthetic Minerals of Ceramic Waste Forms. II. Studies of Uranium–Containing Monazites". Nov. 20, 1980, pp. 198–199.

R.J. Floran et al; Chemical Abstracts vol. 95, No. 24. Dec. 14, 1981. Abstract No. 209064.

J. G. Pepin et al; Chemical Abstracts vol. 96, No. 4. Jan. 25, 1982. Abstract No. 27678.

Y. Hikichi et al; Chemical Abstracts vol. 116, No. 6. Feb. 10, 1992. Abstract No. 43731v.

L. A. Boatner & B. C. Sales; "Monazite, Radioactive Waste Forms for the Future" (1988); pp. 495–564.

G. A. Bukhalova, I.V. Mardirosova, and M.M. Ali; "Preparation and Properties of Cerium Polyphosphate and the Classification of Phosphates" (1988); pp. 1438–1440.

*Primary Examiner*—Gary P. Straub
*Assistant Examiner*—Melanie C. Wong
*Attorney, Agent, or Firm*—Oblon, Spivak, McClelland, Maier & Neustadt, P.C.

[57] ABSTRACT

The invention relates to a method of manufacturing compounds of the Monazite type, doped or not doped with actinides, to a method of packaging radioactive waste, high in actinides and in lanthanides by incorporating this waste in a confining matrix based on Monazite, and to a block for the packaging of radioactive waste that includes a Monazite matrix containing the radioactive elements. This method includes mixing, in the solid phase, reactants comprising an inactive compound of the lanthanide metaphosphate type Ln $(PO_3)_3$ and one or more lanthanide oxides and/or one or more compounds capable of reacting with this oxide or these oxides during a thermal sintering process; the shaping of the mixture thus obtained, and the reaction sintering of said formed mixture, as a result of which a Monazite or a compound of the Monazite type is obtained.

24 Claims, 3 Drawing Sheets

METHOD OF MANUFACTURING COMPOUNDS OF THE MONAZITE TYPE, DOPED OR NOT DOPED WITH ACTINIDES AND APPLICATION TO THE PACKAGING OF RADIOACTIVE WASTE HIGH IN ACTINIDES AND IN LANTHANIDES

This invention relates to a method of manufacturing compounds of the Monazite type, doped or not doped with actinides as well as a method of packaging radioactive waste high in actinides and in lanthanides using these Monazite type compounds as a confinement matrix. Finally, this invention relates to a radioactive waste packaging block that includes a Monazite matrix containing radioactive elements.

Monazite is a natural phosphate mineral, containing a high level of light rare earth elements as well as a few per-cent of uranium and thorium. The general chemical formula of this mineral is $LnPO_4$ where Ln represents the entire series of light rare earth elements from lanthanum to terbium. This mineral is commonly exploited as a source of rare earths.

This material when manufactured synthetically can have interesting applications, in particular, in the field of refractory materials and for the packaging of nuclear waste.

The known, currently used synthetic routes involve reacting one or more rare earth salts with a phosphate compound.

Hence, the document "MONAZITE" by L. A. BOATNER, J. C. SALES, Radioactive Waste Forms for the Future, C. EWING p. 495–564—ISBN 0-444-87104-7 (1988) describes a synthesis of Monazite which involves essentially cerium (III) nitrate hexahydrate of formula $Ce(NO_3)_3 \cdot 6H_2O$ and ammonium hydrogenphosphate or diammonium phosphate $(NH_4)_2HPO_4$. More precisely, in this document, the preparation of lanthanide orthophosphate ceramics by precipitation with urea is described. This precipitation method can be applied to any lanthanide present naturally, but one can also prepare pure and doped $YPO_4$ and $ScPO_4$.

The mixture of lanthanide oxides and actinide oxides, which can be constituted notably by waste arising from the nuclear industry, is first of all dissolved, with heating, in an aqueous solution of nitric acid (1). Then cerium nitrate $Ce(NO_3)_3 \cdot 6H_2O$ (2) and water are added. Next, ammonium hydrogen phosphate $(NH_4)_2HPO_4$ (3) is dissolved in this solution and the mixture (4) is homogenised. A metathesis reaction forms the orthophosphate of the mixed lanthanide waste, the latter being essentially made up of actinide compounds. Then, from this mixture, a precipitation (6) is carried out initiated by the addition of urea $NH_2$—CO—$NH_2$ (5) in particulate form, and by heating the mixture to about 180° C., until precipitation (6) occurs.

Water vapour, nitrogen, ammonia, hydrogen and carbon dioxide are released after heating to 400° C.

The final stage of production of powders by this technique includes the transfer of the material into a ceramic crucible, for example, an alumina crucible, and the complete calcination (7) of the powder at 800° C.

The powders thus obtained are then densified by sintering under a load (8).

The apparent or bulk density of the powders obtained is strongly dependent on the quantity of urea added during the controlled precipitation step.

This document also brings to the fore the influence of the molar ratio of urea/$CePO_4$ on the bulk density.

In addition to this document, there are numerous publications which have dealt with the synthesis of compounds of the Monazite type: these syntheses are differentiated essentially by the starting materials utilised: in effect, a large number of rare earth salts such as carbonates, nitrates, oxalates, hydroxides, and phosphate compounds such as orthophosphoric acid, ammonium hydrogenphosphates and alkaline phosphates can be used.

The synthesis can also be carried out by a liquid route, that is to say by precipitation and reaction, or yet again by a hydrothermal synthesis, namely a synthesis under pressure and at a high temperature in a liquid medium.

All of these synthesis routes use a molar ratio of lanthanide/phosphorus close to 1, so as to obtain a final compound of the Monazite type of formula $LnPO_4$ where Ln represents an element of the lanthanide series from lanthanum to terbium. In effect, beyond the element terbium in the lanthanide series, in the direction of increasing atomic number, a different structural phase, of the Xenotime type appears.

These synthetic methods, in particular, in the case of the packaging of radioactive products mean carrying out at least four steps, which are more or less easy to control.

Hence there exists a need for a method that permits the preparation of Monazite, or more generally compounds of the Monazite type, by a reduced number of steps, these steps having reduced complexity and offering easy implementation and which employ starting reactants that are cheap and easily available and/or can be easily synthesised.

In the particular case of the synthesis of Monazite involving reactants that arise from radioactive waste materials, so as to package these waste materials by including the radioactive elements in the structure of Monazite or a compound of the Monazite type, it would be equally desirable to make available a method which also has a reduced number of steps, is easy to implement, the number of steps carried out in a radioactive environment being, in addition, kept to a minimum.

The steps carried out in a radioactive environment must also be of minimum complexity and must limit the nuclear dangers associated with criticality.

These objectives and others are achieved according to the invention by a method of manufacturing or synthesising Monazite or compounds of the Monazite type in which:

the reactants, including a compound of the lanthanide metaphosphate type of formula $Ln(PO_3)_3$ and one or more lanthanide oxides and/or one or more actinide oxides or one or more compounds capable of giving this oxide or these oxides during the thermal reaction sintering, are mixed in the solid phase, the mixture thus obtained is shaped, a reaction sintering is carried out on the shaped mixture of solids, that results in a Monazite or a compound of the Monazite type being obtained.

This new synthesis route uses as an essential starting reactant or as an intermediate reactant, and in an original manner, a lanthanide rare earth metaphosphate of general formula $Ln(PO_3)_3$.

This method provides simplification compared with the usual methods of manufacture of Monazite and compounds of the Monazite type, such as those described in the prior art and, in particular, in the document already discussed above. This simplification is directed first of all towards the number of synthesis steps involved, in effect the chemical synthesis phase and the calcination phase are done away with. Because of this, the method according to the invention only comprises three steps, which are mixing/milling, shaping and the reaction sintering.

The sintering carried out in the method according to the invention is a solid state reaction sintering, that is to say that this reaction sintering brings together at the same time the steps of the reaction of the powders, the conversion to a Monazite phase and the densification of the material. Hence the Monazite or the Monazite type compound are obtained because of reactions taking place in the course of the sintering, while, in the prior art, such a reaction does not take place during sintering and only the simple densification occurs of a product already present before the sintering takes place.

This simplification in addition, allows the complexity of the steps implemented to be reduced. The steps can be carried out dry, in a solid medium and the characteristic features of the chemical synthesis can also be done away with.

In the particular case of a Monazite synthesis involving radioactive compounds which arise in particular in the form of waste materials from the nuclear industry, the method according to the invention allows one to limit the number of steps carried out in a radioactive environment with reactants that are difficult to handle. On the other hand, the fact of being able to carry out a synthesis by a solid route permits simplification of the method and also allows the nuclear dangers associated with criticality to be limited. These dangers are, in effect more difficult to control during the process steps implemented in the methods of the prior art, in particular during the precipitation step.

The three steps of the method according to the invention are easy to implement, notably within the framework of an installation operating with active products, by the furnace techniques of ceramic technology. The result is that industrialisation of the method according to the invention on a large scale does not present any particular difficulties.

The lanthanide metaphosphate may be an industrially available compound, but according to one preferred form of the method according to the invention, the lanthanide metaphosphate can be synthesised in the course of what will then constitute the first part of the method according to the invention, the second part of the method comprising the synthesis itself of the Monazite or Monazite type compound, by mixing the lanthanide metaphosphate as the starting reactant with the compounds specified above, and by the succession of steps already described above. This lanthanide metaphosphate synthesis can occur in other places and in other installations and not necessarily on the same site as the synthesis of the Monazite or the packaging of the nuclear waste.

In the particular case of the packaging of nuclear waste materials, the method in its preferred form, compared with the prior art, allows a large part of the steps forming the whole of the method, namely the synthesis of the lanthanide metaphosphate, to be carried out without radioactive elements and with reactants that are inert and easily available. The radioactive waste is only incorporated in the second part of the method. Because of this, the number of steps comprising the method of packaging the radioactive waste as such, is reduced to three, namely mixing/milling, shaping and the reaction sintering.

Other characteristics and advantages of the invention will appear more clearly on reading the description which follows, given, it is understood, for illustrative purposes only, being non-limitative, and making reference to the appended drawings in which FIG. 1 already mentioned above is a diagram representing the steps of the method for the synthesis of Monazite described in the prior art represented by the document of L. A. BOATNER et al. already quoted above;

FIG. 2 is a diagram representing the steps of the method of manufacture of a Monazite or a Monazite type compound conforming to the invention, according to a particular preferred form of the method according to the invention, comprising, in a first part, the synthesis of a lanthanide metaphosphate by a method that comprises essentially two steps and a third optional milling step, FIGS. 3 to 6 illustrate, more precisely, the blocks for the packaging of radioactive waste obtained in conformity with the invention:

Figure 1:
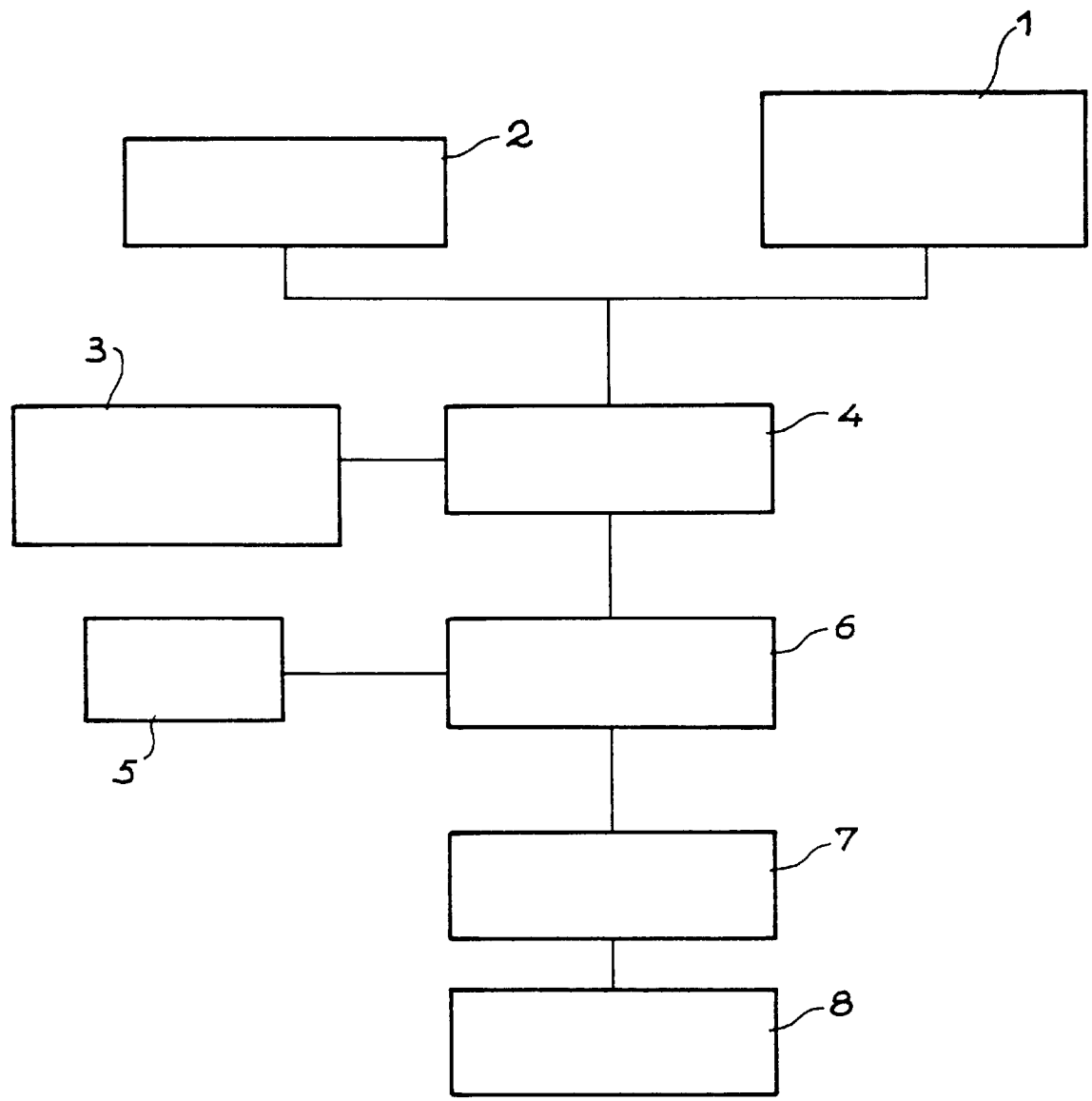
Figure 2:
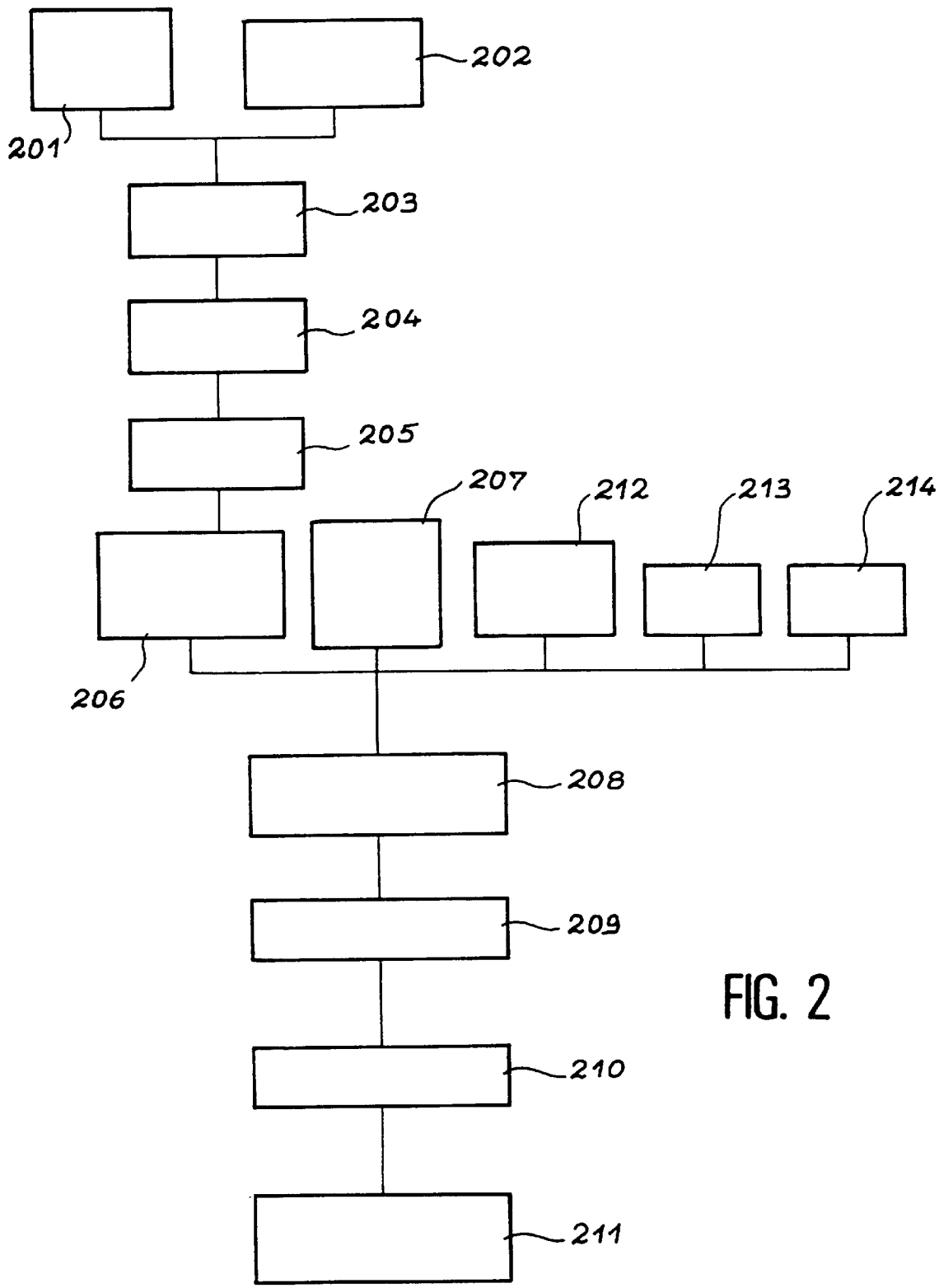

On referring to FIG. 2, it may be observed that the method according to the invention includes, in its preferred form and in a first part, the synthesis of a lanthanide metaphosphate type compound or starting reactant for the synthesis of the Monazite or Monazite type compound. This intermediate compound or lanthanide metaphosphate type starting product plays an essential role in the method for the synthesis of the Monazite or Monazite type compound according to this invention.

The synthesis of this intermediate compound or starting product which is a rare earth (III) metaphosphate corresponding to the general formula $Ln(PO_3)_3$ where Ln is an element from the lanthanide series chosen, for example, from among La, Ce, Pr, Nd, Pm, Sm, Eu, Gd and Tb, with La and Ce being preferred, has already been described in the literature, in particular in the document "Preparation and Properties of Cerium Polyphosphate and Classification of Phosphates", G. A. Bukhalova, I. V. Mardirosova, M. M. Ali —Russian Journal of Inorganic Chemistry 33 (10), pp. 1438–1440, 1988. translated from Zhyrnal Neorganichekoi Knimii, 33, 2511–2514 (1988) where the synthesis of cerium metaphosphate by solid phase reactions has been studied.

However, different synthesis routes for this intermediate compound or starting reactant are possible and the synthesis route which is described in FIG. 2 (reference numbers 201 to 205) is only given for information purposes and other synthesis routes can be envisaged under conditions close to those that allow the Monazite phase to be obtained while preferably keeping to a lanthanide(s)/phosphorus ratio close to $\frac{1}{3}$.

Preferably, first of all, a homogeneous mix (203) is made, for example by milling an inactive lanthanide salt (201) chosen, for example, from among the nitrates, halides, carbonates, oxalates and oxides of a lanthanide, and their mixtures, with a phosphate compound (202) chosen, for example, from among orthophosphoric acid, ammonium hydrogenphosphate and their mixtures.

The mixture can be produced in any suitable apparatus known to a man skilled in the art. However, preferably a planetary mill is used. The homogeneous mixture thereby obtained is then possibly subjected to drying (not shown), preferably at a temperature between 100° C. and 200° C., then a calcination operation (204) at a temperature preferably greater than 500° C. and lower than the melting point of the lanthanide metaphosphate that one wishes to obtain. Hence, in the case of cerium metaphosphate, the calcination temperature will have to be below 1256° C. which is the melting point of cerium metaphosphate.

The calcination is preferably carried out in a furnace under an air flow, which allows the gaseous products evolved, essentially consisting of $HNO_3$, $NO_x$, $NH_3$ ... to be carried away.

The calcination treatment is followed optionally by dry milling (205) of the product obtained, preferably in a planetary mill in such a way that a powder of the desired particle size distribution is obtained, that is to say with a particle size preferably less than 0.1 mm. A finer milling is still more favourable for the remainder of the method.

It should be noted that all of these steps by which the synthesis of the lanthanide metaphosphate, an inactive product (206), is carried out, only involve products which are themselves inactive and can even be carried out in a totally separated fashion in independent installations.

Conforming to the method according to the invention, the Monazite or Monazite type compound is synthesised by a method whereby the lanthanide metaphosphate—prepared preferably as described above in what can constitute the first part of the method— is used as a starting product in order to synthesise the Monazite or Monazite type phase in what can then constitute the second part of the method.

Different compounds of Monazite structure can then be envisaged.

Total solid compositions exist between the pure extremes of rare earths from lanthanum to terbium, for example between $CePO_4$ and $LaPO_4$. Beyond the element terbium and in passing in the direction of increasing atomic numbers within the lanthanide series, partial solid solutions exist.

In the case of the actinides, it has also been demonstrated that partial or total solid solutions exist between the orthophosphates of lanthanides and the actinide phosphates. For example, a total solid solution exists between the extremes $CePO_4$ and $Ca_{0.5}U_{0.5}PO_4$. Several cases can be envisaged for the synthesis of these different compounds.

When one wishes to carry out the synthesis of Monazite containing lanthanides, this synthesis can be made by a method comprising the following steps, described in FIG. 2; first the solid phase mixing (208) is carried out of the lanthanide metaphosphate (206) and one or more lanthanide oxides (207) or one or more compounds capable of giving one or more oxides during the subsequent reaction sintering process; these may be for example, carbonates, oxalates, nitrates, halides, preferably chlorides, etc. The mixing of the inactive lanthanide metaphosphate (206) with one or more lanthanide oxides (207) must preferably by done in such a way that the lanthanum/phosphorus ratio is kept close to 1. The solid phase mixing/milling (208) is generally carried out by a dry route starting with reactant powders, for example of lanthanide metaphosphate and oxide or oxides with a particle size preferably less than 500 micrometres ($\mu$m) and more preferably between 50 and 200 $\mu$m.

The homogeneous mixture of the two powders thus obtained is then shaped (209) preferably pressed, for example in a pelletting press or a granulating press in order to make it into cylindrical tablets for example, at a pressure preferably at least equal to 50 MPa (500 bars), preferably between 50 MPa and 150 MPa (500 and 1500 bars) for example 100 MPa (1000 bars).

The shaped, preferably pressed, products are then carried into a reaction sintering furnace (210) in order to be densified. This reaction sintering can be a natural sintering which, carried out under optimum conditions, allows densification of the material up to 95% of the theoretical density without pressure, or a reaction sintering under load at a pressure preferably from 100 to 500 MPa which allows the final density of the product and the texture of the material to be improved and the sintering temperature to be reduced. The atmosphere during the reaction sintering can be neutral, for example argon, or reducing, for example a mixture of argon and 5% hydrogen, or oxidising, for example air.

The temperature of the support pedestal for the reaction sintering can be preferably at least 1000° C. and preferably between 1200° C. and 1400° C. and the duration of the sintering reaction should preferably be between 30 seconds and 4 hours.

The reaction forming the final Monazite phase that includes the lanthanides (211) occurs during the reaction sintering heat treatment (210) and can be written in a general manner in this way in the case of lanthanide Ln (III) oxides:

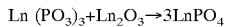

$$Ln(PO_3)_3 + Ln_2O_3 \rightarrow 3LnPO_4$$

The equivalent reaction also takes place with the lanthanide Ln (IV) oxides of the $LnO_2$ type and can be written in a general manner:

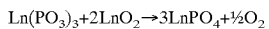

$$Ln(PO_3)_3 + 2LnO_2 \rightarrow 3LnPO_4 + \tfrac{1}{2}O_2$$

in which Ln preferably represents Ce.

In this case the evolution of oxygen is observed during the formation of the Monazite phase.

This reaction can be written in the same way for all the lanthanide oxides and can also be written for mixtures of lanthanides. The same applies for any lanthanide metaphosphate.

The general reaction that occurs during the sintering process will then be the following in the case of lanthanide Ln (III) oxides:

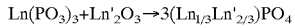

$$Ln(PO_3)_3 + Ln'_2O_3 \rightarrow 3(Ln_{1/3}Ln'_{2/3})PO_4$$

Ln and Ln' being elements in the lanthanide series and Ln and Ln' representing different lanthanides.

Similarly and in a manner analogous to that mentioned above, the following reaction can be written in the case of lanthanide Ln' (IV) oxides of the $Ln'O_2$ type.

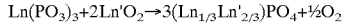

$$Ln(PO_3)_3 + 2Ln'O_2 \rightarrow 3(Ln_{1/3}Ln'_{2/3})PO_4 + \tfrac{1}{2}O_2$$

The general formula of the Monazites prepared will then be $Ln_xLn'_{(1-x)}PO_4$ with x varying from 0 to 1.

The reactions described above with the oxides can also be carried out with compounds capable of giving oxides during the thermal sintering process, these compounds can for example be oxalates, carbonates, nitrates or halides, in particular chlorides or any other reactant giving an oxide in the course of the thermal reaction sintering process, that is to say, for example from 900° C. and generally at a temperature between 1000 and 1400° C.

The lanthanide that is reacted in the form of an oxide can be a radioactive element, but it may also be an inert element. Because of this, the Monazite obtained will be either inert or active.

When one wishes to carry out the synthesis of a Monazite containing actinides, the method used is substantially the same as that previously described for the lanthanides and comprises the same essential steps (208 to 210). In effect, in the reactions described above, the lanthanide oxides can be replaced by actinide oxides (212) or by compounds capable of giving oxides during the subsequent reaction sintering process. However, the actinides have a large number of possible valences and two main cases may be envisaged.

1. The actinide being considered (212), denoted by Ac, is stable with valency (III) in the Monazite structure, this being the case for the elements Am, Cm and for example plutonium.

It then suffices to simply replace the lanthanide oxide mentioned above by an actinide oxide. As there is a wide ranging group of solid solutions, one can proceed with mixtures of lanthanides, for example lanthanum and terbium, and with different actinides, or even with mixtures of mixed lanthanides and actinides.

The general reactions that occur are the following:

$$Ln(PO_3)_3 + 2AcO_2 \rightarrow 3(Ln_{1/3}Ac_{2/3})PO_4 + \tfrac{1}{2}O_2 \text{ or}$$

$$Ln(PO_3)_3 + Ac_2O_3 \rightarrow (Ln_{1/3}Ac_{2/3})PO_4$$

A supplementary addition of a rare earth oxide allows the content of the actinide to be varied and all the possible solid solutions to be prepared.

The Monazites obtained correspond to the following general formula:

$$(Ln_xAc_{(1-x)})PO_4 \text{ with x varying from 0 to 1}$$

2. The actinide is considered to be stable with the valency IV in the Monazite structure, which is the case, for example, with elements such as Th, Pa, U, Np and Pu which are denoted below as Ac.

In order to cause the actinide element to go into the crystal structure, there are two possibilities:

a bivalent element can be added to the formulation, selected to compensate for the charge and provide overall electronic neutrality for the structure. This element must have an ionic size compatible with the lanthanide site in the Monazite structure. There is, for example calcium or lead. This reactant is introduced into the mixing step (208) in the form of oxide powder (213) or in the form of a compound capable of giving an oxide. The general reactions occurring in this case, for example, with calcium are the following:

$$Ln(PO_3)_3 + AcO_2 + CaO \rightarrow 3(Ln_{1/3}Ac_{1/3}Ca_{1/3})PO_4$$

A supplementary addition of a rare earth oxide allows the content of the actinide to be varied and all the possible solid solutions to be prepared.

The Monazites obtained correspond to the following general formula:

$$(Ln_{(1-2x)}Ac_xCa_x)PO_4 \text{ x being between 0 and } \tfrac{1}{2}$$

or one can add a tetravalent oxide group that can substitute for the $PO_4^{3-}$ group and which notably can be a $SiO_4^{4-}$ group, for example in the form of silica (214) during the mixing step (208).

The general reaction occurring in this case with the silica, and which takes place during the thermal sintering reaction process is the following:

$$(1-x)Ln(PO_3)_3 + 2(1-x)LnO_2 + 3xAcO_2 + 3xSiO_2 \rightarrow$$

$$3Ln_{(1-x)}Ac_x(SiO_4)_xPO_{4(1-x)} + \frac{1-x}{2}O_2,$$

between 0 and 1 and the compound obtained is a Monazite type compound corresponding to the general formula below, in the case of silica:

$Ln_{(1-x)}Ac_x(SiO_4)_xPO_{4\,(1-x)}$, which can be generalised for any tetravalent oxide.

In the same way as for the lanthanides, the reactions described here with the actinide oxides can also be carried out with compounds capable of giving oxides during the thermal sintering treatment. These may be nitrates, carbonates, oxalates, halides, particularly chlorides or any other reactant giving an oxide during the course of the heat treatment starting from 900–1000° C.

3. It must finally be mentioned that under particularly reducing conditions, certain actinides, normally of valency IV can however be incorporated at a low level, that is to say, for example, up to 10% in the structure under a valency of III. This is the case, for example, with uranium or plutonium.

The charge compensation is no longer necessary then and one is brought back to the previous case.

In a more general case, the Monazites obtained correspond to the following formula, in the case where the charge compensation is provided by calcium $$(Ln_{(1-2x-y)}Ac_y^{III}Ac_x^{IV}Ca_x)PO_4$$

with $Ac^{III}$ representing an actinide with valency 3
$Ac^{IV}$ representing an actinide with valency 4 and Ln representing an element in the lanthanide series.

The Monazites obtained in the case where the charge compensation is made by addition of silica correspond to the following formula:

$$Ln_{(1-2-y)}Ac_y^{III}Ac_x^{IV})PO_{4(1-x)}SiO_{4x}$$

where the symbols have the same meaning as above.

A mixed solution is always possible which then gives a general formula of the type:

$$Ln_{(1-x-y-t)}Ac_y^{III}Ac_x^{IV}Ca_t)(PO_4)_{1-z}(SiO_4)_z$$

in this case with x, y, z, t<1 and z=x–t

Finally, the preceding formula can then be generalised in the form:

$$Ln_{(1-x-y-t)}Ac_y^{III}Ac_x^{IV}X_t)(PO_4)_{1-z}(Y)_z$$

with
Ln: An element in the lanthanide series
$Ac^{III}$: A trivalent actinide
$Ac^{IV}$: A tetravalent actinide
X: A bivalent element for charge compensation that may be, for example Ca, Pb, . . .
Y: A tetravalent element or group for charge compensation that may be, for example $SiO_4^{4-}$.

According to the invention, the Monazites prepared by the method described above can be inert, but preferably include in their chemical structure, active elements such as lanthanides and actinides which, for example, form part of radioactive waste materials arising from various origins, for example, from the reprocessing of nuclear fuel.

The Monazites prepared by the method above, whether they be inert or whether they incorporate active elements, can be used as a confinement matrix to incorporate radioactive waste, in particular, radioactive waste materials with a long life, such as the actinides.

To put it another way, the Monazite matrix can be formed from non-active elements and be used solely as a matrix for encapsulation of radioactive waste, or it can include, within its chemical structure, the active elements from the waste such as lanthanides and/or actinides. In effect the Monazites offer all the qualities required of materials used as a confinement matrix: namely very high chemical stability, very high stability to radiation and very high stability to temperature, in order to isolate the radioactive elements from the environment and to maintain them in this isolated state over very long periods of time, because of their radioactive half-life. According to the invention, the Monazite matrix can be formed from non-active elements and be used uniquely as a matrix for encapsulation of radioactive waste, or it can include, within its chemical structure, the active elements from the waste such as lanthanides and/or actinides.

When the radioactive elements are directly incorporated in the chemical structure, one may, in addition arrange around this Monazite containing the lanthanides and/or actinides to be packaged, at least one layer of non-active Monazite and possibly other layers of a Monazite of different composition, in such a way that suitable successive barriers are constituted between the active waste and the environment.

Similarly, one or more layers of Monazite of different composition can be arranged around waste materials surrounded by a first layer of non-active Monazite.

In the two cases, the innermost layers are preferably chosen to resist radiation damage, and the outermost layers can be chosen to resist the attacks of the external environment. A man skilled in the art will not have a problem in choosing the layers in such a manner as to provide the assembly with the desired properties, particularly the desired mechanical properties.

The Monazites and Monazite type compounds can therefore be used as a material forming a confinement matrix for radioactive waste rich in lanthanides and in actinides and constitute a block for packaging radioactive waste materials which can take various different forms.

Figure 3:
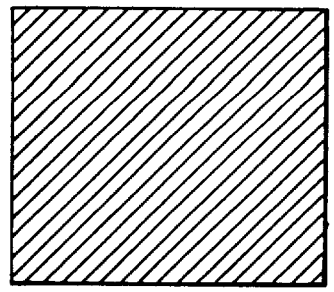
FIG. 3 represents a homogeneous matrix.

In FIG. 3, the Monazite block incorporating the different radioactive elements is homogeneous in composition. The radioactive elements are incorporated in a solid solution in the structure of the mineral itself, that is to say in the Monazite.

Figure 4:
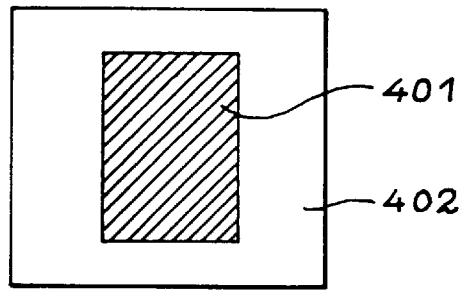
FIG. 4 represents a heterogeneous material with a Monazite core within an inactive matrix.

In FIG. 4, the block is heterogeneous and comprises a Monazite core (401) incorporating the radioactive waste materials and a peripheral inactive layer (402) of Monazite or of any other material having a high resistance to external attack, for example a glass or a concrete.

Figure 5:
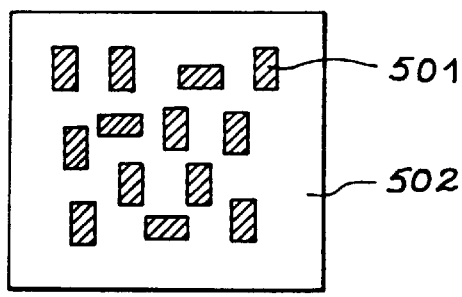
FIG. 5 represents a heterogeneous matrix with blocks of Monazite within an inactive matrix.

In FIG. 5, the block is heterogeneous and is made up of inclusions, for example, of size 1 to 50 mm of Monazite incorporating radioactive waste materials (501) in an inactive matrix (502) of Monazite or of a phosphate compound compatible with Monazite or another material resistant to external attack, for example, a glass or a concrete.

Figure 6:
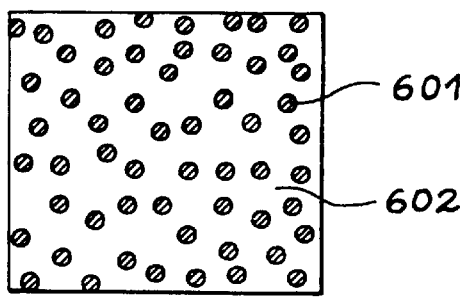
FIG. 6 represents a matrix comprising micro-inclusions of Monazite within an inactive matrix. It is clear that in the description, the term "Monazite" can also denote a Monazite type compound.

In FIG. 6, the block is heterogeneous and is made up of micro-inclusions, for example, of size from 0.5 to 1000 $\mu$m of Monazite incorporating the nuclear waste materials (601) in an inactive matrix (602) of Monazite or of any other material resistant to external attack, for example, a phosphate compound compatible with Monazite or a glass or a concrete.

The different packages or heterogeneous blocks are generated by mixing. The mix of a metaphosphate with, for example the lanthanide oxide is made on the one hand and then this with the inert matrix on the other hand. For example, after the solid phase mixing step, the powder is granulated by a suitable piece of equipment such as a granulating press, then these granules are incorporated into a powdered inactive matrix made up of, for example a phosphate compound compatible with Monazite or glass or concrete. After compacting the whole thing into a refractory, the item is put into the furnace for the reaction sintering step. After the reaction sintering, the package or block obtained is of the type shown in FIG. 3.

The examples given below illustrate the method of preparation of Monazite conforming to the invention as well as the method of packaging radioactive waste materials according to the invention.

EXAMPLE 1

Preparation of cerium (III) metaphosphate

Cerium (III) metaphosphate is prepared by following the following method:

Pure cerium nitrate and pure orthophosphoric acid in a molar ratio of Ce/P of ⅓ are mixed in a planetary mill.

Drying is then carried out at a temperature of 110° C. and then calcination in a furnace at a temperature of 500° C. in air.

The product obtained is dry milled in a planetary mill in such a way as to obtain a powder, the particles of which have a particle size of the order of 100 $\mu$m.

EXAMPLE 2

Synthesis of Monazite containing cerium

Cerium (III) oxide $Ce_2O_3$ is added to the cerium metaphosphate prepared in Example 1 in such a way as to keep the ratio Ce/P=1. Then an intimate mixture is formed by mixing the two constituents in a planetary mill for thirty minutes.

The powder obtained is then pressed into solid cylindrical shapes at a pressure of 100 MPa, and then sintered at a temperature of 1400° C. for one hour.

The overall synthesis reaction which takes place during the reaction sintering heat treatment can be written as:

$Ce(PO_3)_3 + Ce_2O_3 \rightarrow 3CePO_4$

The equivalent reaction takes place with cerium (IV) oxide $CeO_2$ with evolution of oxygen during the formation of the Monazite phase.

EXAMPLE 3

Synthesis of Monazite containing uranium and preparation of homogeneous blocks of Monazite Uranium is stable in the Monazite structure with a valency of IV. Calcium is chosen as the bivalent element for charge compensation. In effect, its ionic radius is close to that of the rare earth elements. Its size is therefore compatible with the receiving site in the Monazite structure. It is added to the formulation during the mixing step.

The overall reaction which takes place during the thermal treatment is the following:

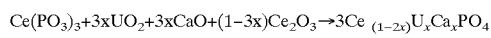

$Ce(PO_3)_3 + 3xUO_2 + 3xCaO + (1-3x)Ce_2O_3 \rightarrow 3Ce_{(1-2x)}U_xCa_xPO_4$ In this example, homogeneous blocks of Monazite containing 10% uranium are being prepared.

The synthesis is carried out following the method given above, in such a way as to obtain a product of formula $(Ce_{0.8}Ca_{0.1}U_{0.1})PO_4$.

Cerium metaphosphate, calcium carbonate and uranium oxide ($U_3O_8$) are mixed together at the same time in a 50 ml bowl of a planetary mill.

Once mixed, the constituents are compressed at 50 MPa into a cylindrical matrix. The tablets have a size of the order of 1 cm.

The tablets are then charged into a furnace which follows a thermal cycle that allows a support pedestal to reach 1400° C. for one hour. The blocks treated in this way are homogeneous in composition. The size of the blocks only depends on the size of the pressed matrix.

The final porosity of the products is of the order of 10%.

EXAMPLE 4

Manufacture of heterogeneous blocks

The small blocks from the previous example can be placed in a container and encapsulated in a cement slurry.

The blocks being of high density (d≈5 g/cm³), they do not float up during the pouring of the cement.

After the water has been taken up, the assembly forms a heterogeneous block.

We claim:

1. A method of manufacturing a sintered Monazite or Monazite compound, consisting essentially of mixing, in the solid phase, reactants comprising a lanthanide metaphosphate compound of formula $Ln(PO_3)_3$ and at least one compound selected from the group consisting of a lanthanide oxide, an oxide of an actinide with a valency of III and a compound capable of generating a lanthanide oxide or an oxide of an actinide with a valency of III during a reaction sintering heat treatment, and mixtures thereof; pressing the mixture thus obtained, and reaction sintering said pressed mixture in the solid phase to form a sintered Monazite or a Monazite compound; wherein said lanthanide is at least one of the light rare earth elements from lanthanum to terbium.

2. A method according to claim 1, wherein the lanthanide metaphosphate is prepared by the homogeneous mixing of a lanthanide salt and a phosphate compound and the calcination of the mixture thus obtained.

3. A method according to claim 2, wherein the lanthanide salt comprises at least one member selected from the group consisting of a lanthanide nitrate, halide, carbonate, oxalate and oxide and their mixtures.

4. A method according to claim 2, wherein the phosphate compound comprises at least one member selected from the group consisting of orthophosphoric acid, ammonium hydrogenphosphate and their mixtures.

5. A method according to claim 2, wherein the calcined product obtained is, in addition, milled so as to obtain a powder with a particle size less than 500 microns.

6. A method according to claim 1, wherein the solid phase mixture is produced by milling the reactant powders.

7. A method according to claim 1, wherein the reaction sintering is carried out with or without pressure, on a sintering support heated to about 1000° C.

8. A method according to claim 1, wherein at least one of said lanthanide oxide, said oxide of an actinide of valency III, or said compound capable of generating a lanthanide oxide or an oxide of an actinide of valency III is radioactive.

9. A method of manufacturing a sintered Monazite compound, consisting essentially of mixing, in the solid phase, reactants comprising a lanthanide metaphosphate compound of formula $Ln(PO_3)_3$, at least one compound selected from the group consisting of an oxide of an actinide with a valency of IV, a compound capable of generating said actinide oxide with a valency of IV during a reaction sintering heat treatment, and mixtures thereof, an optional lanthanide oxide or compound capable of generating a lanthanide oxide during a reaction sintering heat treatment, and at least one compound selected from the group consisting of an oxide of a bivalent compound or a compound capable of generating said oxide of a bivalent compound during a reaction sintering heat treatment, an oxide capable of providing a tetravalent group during a reaction sintering heat treatment which substitutes for the $PO_4^{3-}$ group in the Monazite compound, and mixtures thereof in an amount sufficient to provide charge compensation in the Monazite compound; pressing the mixture thus obtained; and reaction sintering said pressed mixture in the solid phase to form a sintered Monazite compound; wherein said lanthanide is at least one of the light rare earth elements from lanthanum to terbium.

10. A method according to claim 9, wherein the bivalent element comprises at least one element of the group consisting of calcium and lead and mixtures thereof.

11. A method according to claim 9, wherein the oxide capable of providing a tetravalent group is silica.

12. A method according to claim 9, wherein the lanthanide metaphosphate is prepared is by the homogeneous mixing of a lanthanide salt and a phosphate compound and the calcination of the mixture thus obtained.

13. A method according to claim 12, wherein the lanthanide salt comprises at least one member selected from the group consisting of a lanthanide nitrate, halide, carbonate, oxalate and oxide and their mixtures.

14. A method according to claim 12, wherein the phosphate compound comprises at least one member selected from the group consisting of orthophosphoric acid, ammonium hydrogenphosphate and their mixtures.

15. A method according to claim 12, wherein the calcined product obtained is, in addition, milled so as to obtain a powder with a particle size less than 500 microns.

16. A method according to claim 9, wherein the solid phase mixture is produced by milling the reactant powders.

17. A method according to claim 9, wherein the reaction sintering is carried out with or without pressure, on a sintering support heated to about 1000° C.

18. A method according to claim 9, wherein at least one of said lanthanide oxide, oxide of an actinide of valency IV, or compound capable of generating a lanthanide oxide or an oxide of an actinide of valency IV is radioactive.

19. A method of immobilizing radioactive waste in a sintered Monazite or Monazite compound, consisting essentially of mixing, in the solid phase, reactants comprising a lanthanide metaphosphate compound of formula $Ln(PO_3)_3$ and at least one compound selected from the group consisting of a lanthanide oxide, an oxide of an actinide with a valency of III and a compound capable of generating a lanthanide oxide of an oxide of an actinide of valency III during a reaction sintering heat treatment, and mixtures thereof; incorporating a radioactive waste comprising at least one of an actinide, a lanthanide, and mixtures thereof into said mixture; pressing the mixture thus obtained, and reaction sintering said pressed mixture in the solid phase to form a sintered Monazite or a Monazite compound containing said radioactive waste; wherein said lanthanide is at least one of the light rare earth elements from lanthanum to terbium.

20. The method of immobilizing radioactive waste according to claim 19, wherein said incorporating is mixing into said reactant mixture powders or granules of said radioactive waste.

21. The method of immobilizing radioactive waste according to claim 12, wherein said incorporating is mixing into said reactant mixture powders or granules of said radioactive waste.

22. A method of immobilizing radioactive waste in a sintered Monzite compound consisting essentially of mixing, in the solid phase, reactants comprising a lanthanide metaphosphate compound of formula $Ln(PO_3)_3$, at least one compound selected from the group consisting of an oxide of an actinide with a valency of IV, a compound capable of generating said actinide oxide with a valency of IV during a reaction sintering heat treatment, and mixtures thereof, and at least one compound selected from the group consisting of an oxide of a bivalent compound or a compound capable of generating said oxide of a bivalent compound during a reaction sintering heat treatment, an oxide capable of providing a tetravalent group during a reaction sintering heat treatment which substitutes for the $PO_4^{3-}$ group in the Monazite compound, and mixtures thereof in an amount sufficient to provide charge compensation in the Monazite compound; incorporating a radioactive waste comprising at least one of an actinide, a lanthanide, and mixtures thereof into said mixture; pressing the mixture thus obtained; and reaction sintering said pressed mixture in the solid phase to form a sintered Monazite compound containing said radioactive waste; wherein said lanthanide is at least one of the light rare earth elements from lanthanum to terbium.

23. The method of immobilizing radioactive waste according to claim 19, wherein said incorporating is encapsulating said radioactive waste in said reactant mixture.

24. The method of immobilizing radioactive waste according to claim 22, wherein said incorporating is encapsulating said radioactive waste in said reactant mixture.

* * * * *